July 20, 1943.  R. E. POWELL  2,324,802
SOLDERING DEVICE
Filed Oct. 5, 1940
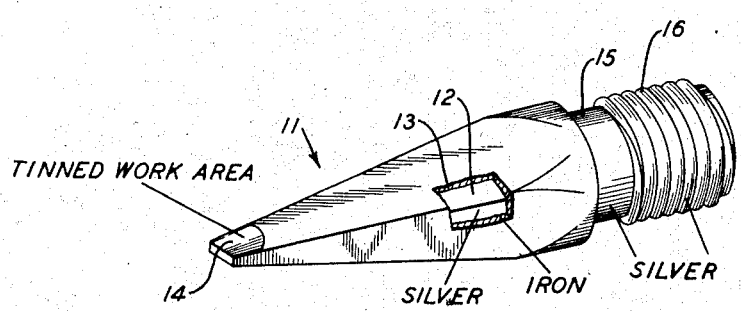
INVENTOR
R. E. POWELL
BY
E. R. Nowlan
ATTORNEY Patented July 20, 1943

2,324,802

UNITED STATES PATENT OFFICE 2,324,802

SOLDERING DEVICE

Raymond E. Powell, Westfield, N. J., assignor to Western Electric Company, Incorporated, New York, N. Y., a corporation of New York Application October 5, 1940, Serial No. 359,877

2 Claims. (Cl. 113—105)

This invention relates to a soldering device, and more particularly to a tip for soldering irons.

The working part or tip of the ordinary soldering iron has been made since immemorial time of copper, usually with a tin coated pyramidal or frusto-pyramidal working end. Sometimes the body is of iron except for a removable tip of copper; or the whole body including the tip may be of copper. The tip may become battered, eroded or corroded in use. Hence, especially in the case of electric soldering irons where the body is also used to house an electric heating element, it is an advantage to have the tip removable for replacement. Such removable tips ordinarily have an integral threaded stem at the rear to be received and held in a correspondingly threaded recess in the front of the body of the iron. Since heat is to be transferred by conduction from the body to the tip and from the tip to the work, it is essential that the flow of heat from the body to the tip and from this to the work be impeded in minimum degree by either structure, condition or material of the parts. The tip should be of material having maximum conductivity for heat. The joint between the tip and body must be, and remain during the life of the tip, of maximum cleanness and intimacy of contact. In practice, as just stated, such tips are of copper and are secured to the body by a threaded connection. However, since the tip, in normal use, is subject to frequent and large changes of temperature state, it is found that the joint will "breathe" to a certain and probably increasing extent, so that oxidation and corrosion of the joint surfaces occur and grow. This creation of a relatively non-conductive film on the joint surface of the tip effects an increasing impediment to the necessary transfer of heat across the joint. Also the substance of the film formed is hard and of greater volume than the metal from which it is formed, so that it tends to lock the tip so tightly in place that this cannot be removed for replacement without serious damage to or even destruction of the joint threads of the body.

An object of the present invention is to provide a removably interchangeable tip for soldering irons, of high conductivity and adapted to be and remain substantially unoxidized and uncorroded, especially on the surfaces at which it is detachably securable to a soldering iron body.

With the above and other objects in view, the invention may be embodied in a soldering iron tip of silver, preferably substantially pure in order to have high heat conductivity, and formed with an integral extension or stem of the same substance threaded or otherwise formed to be removably secured to a correspondingly formed soldering iron body, the working part of the tip being optionally armored with a protective sheathing of iron or other relatively harder metal.

Other objects and features of the invention will appear from the following detailed description of one embodiment thereof taken in connection with the accompanying drawing in which the single figure is a broken, diagrammatic, perspective view of a removable tip for soldering irons constructed in accordance with the invention.

As embodied in the present disclosure, a tip for soldering irons, generally indicated by the numeral 11, comprises a relatively massive, metal body 12 of silver, preferably as pure as reasonably possible. This body 12 is extended at the rear as an integral stem or base 15 formed with means or members such as the screw thread 16 whereby the whole tip may be removably secured to the correspondingly formed body of a soldering iron (not shown).

The body 12, but not the extension 15, is provided on its outer surfaces with a continuous, relatively thin, superficial armor 13, preferably of iron, which in turn is superficially coated over its working area with tin, as at 14.

It is found that a tip as thus constructed will, even over long periods of intensive service, fail to suffer any material oxidation or corrosion of the surfaces of the connector extension 15 and its threads 16. Although "breathing" undoubtedly takes place between the tip 11 and the body of the iron in which it is held, the oxidation or corrosion, if any, effected thereby is merely superficial and does not proceed to any material depth even after a period of time in which the armored body 12 becomes worn out or too battered for service. The tip does not lock or "freeze" into the body of the iron and may be removed therefrom for replacement without harm thereto. Despite the relative softness and malleability of pure silver, or of silver containing only such amounts of unintended impurities or of intentional alloying ingredients as will not materially reduce its preeminent capacity to contain and transfer heat, the locking engagement of the extension 15, by means of its threads 16 or other locking members, with a soldering iron body is and remains firm and close, there being no need to remove the tip and scrape or otherwise clean the locking surfaces of corrosion products to restore heat conductivity across the joint.

While, as stated, pure silver is preferred for the body 12 and its integral extension 15, because of the high heat conductivity of pure silver, silver containing impurities or additions of other elements, in such small amounts only as will not harmfully lessen the conductivity for heat, is naturally also included within the scope of the invention. In the appended claims, where the word "silver" is employed alone, it is intended to include both substantially pure silver and silver containing such minor admixtures as do not harmfully alter its conductivity for heat; while "pure silver" is intended to mean silver without material admixture.

While, as disclosed, the body 12 of the tip is armored with iron, and while iron is generally preferred for this purpose, the armor may be of any suitable material, e. g. copper, so long as it does not extend over the extension 15 and its locking means 16. Indeed, in some instances, the armor may be dispensed with, if desired, for special uses; although in general silver is attacked to such an extent by ordinary solders as not to be practicable unprotected.

Furthermore, the tip as disclosed has an integral threaded extension to engage in a correspondingly threaded recess in a soldering iron body. This is the usual practice in detachable tip irons. However, if desired for any reason, the recess could be in the tip and the extension a part of the body.

The embodiment disclosed is illustrative and may be modified and departed from in various ways without departing from the spirit and scope of the invention as pointed out in and limited solely by the appended claims.

What is claimed is:

1. A detachable tip for soldering irons, which tip comprises a body portion and an attaching portion integral with the body portion, the body portion and the attaching portion consisting essentially of silver, in combination with a protective armor of harder metal on the working surfaces only of the body portion.

2. A detachable tip for soldering irons, which tip comprises a body portion and an attaching portion integral with the body portion, the body portion and the attaching portion consisting essentially of silver, in combination with a protective armor of iron on the working surfaces only of the body portion.

RAYMOND E. POWELL.